(12) United States Patent
Yun et al.

(10) Patent No.: US 8,549,989 B2
(45) Date of Patent: Oct. 8, 2013

(54) PISTON APPARATUS FOR ENGINE

(75) Inventors: Jeyong Yun, Hwaseong-si (KR); Byungcheol Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 315 days.

(21) Appl. No.: 12/949,394

(22) Filed: Nov. 18, 2010

(65) Prior Publication Data

US 2012/0060789 A1    Mar. 15, 2012

(30) Foreign Application Priority Data

Sep. 15, 2010  (KR) .................. 10-2010-0090486

(51) Int. Cl.
*F16J 1/18* (2006.01)
*F16J 1/14* (2006.01)

(52) U.S. Cl.
USPC .......... 92/187; 123/193.6; 403/150; 403/151; 403/152; 403/154; 403/155; 92/189

(58) Field of Classification Search
USPC ................ 92/187; 123/193.6; 285/305; 403/150–152, 154
See application file for complete search history.

(56) References Cited

U.S. PATENT DOCUMENTS

| | | | | |
|---|---|---|---|---|
| 1,643,720 A * | 9/1927 | McKone | ................... | 92/187 |
| 2,396,084 A * | 3/1946 | Clark | ................... | 92/218 |
| 2,913,292 A * | 11/1959 | Rogers | ................... | 403/155 |
| 3,527,485 A * | 9/1970 | Stanley et al. | ................... | 285/305 |
| 4,535,682 A * | 8/1985 | Collyear et al. | ................... | 92/153 |
| 4,872,395 A * | 10/1989 | Bennitt et al. | ................... | 92/139 |
| 6,276,260 B1 * | 8/2001 | Bianchi | ................... | 92/187 |
| 2009/0196683 A1 * | 8/2009 | Lunn et al. | ................... | 403/154 |

FOREIGN PATENT DOCUMENTS

| | | |
|---|---|---|
| JP | 7-317900 A | 12/1995 |
| JP | 2002-202057 A | 7/2002 |
| JP | 2005-325954 A | 11/2005 |
| WO | WO 98/44280 A1 | 10/1998 |
| WO | WO 01/33114 A1 | 5/2001 |

\* cited by examiner

*Primary Examiner* — Lindsay Low
*Assistant Examiner* — Kevin Lathers
(74) *Attorney, Agent, or Firm* — Morgan, Lewis & Bockius LLP

(57) ABSTRACT

A piston apparatus for an engine includes a piston pin that is inserted in a smaller end portion of a connecting rod and having a cross-section changing portion where a cross section changes at a portion of the piston pin, and a fixing member that engages the connecting rod and a piston through the cross-section changing portion so as to restrain longitudinal movement of the piston pin with respect to the connecting rod.

11 Claims, 8 Drawing Sheets

PISTON APPARATUS FOR ENGINE

CROSS-REFERENCE TO RELATED APPLICATIONS

The present application claims priority to Korean Patent Application No. 10-2010-0090486 filed Sep. 15, 2010, the entire contents of which is incorporated herein for all purposes by this reference.

BACKGROUND OF THE INVENTION

1. Field of the Invention

The present invention relates to a piston apparatus for a reciprocating engine, and more particularly, to a connecting structure between a piston and a connecting rod.

2. Description of Related Art

Reciprocating engines have a structure connecting a piston to a crankshaft through a connecting rod to transmit pressure generated from the combustion chamber to the crankshaft.

The larger end portion of the connecting rod is rotatably connected to the crankpin of the crankshaft and the smaller end portion is connected to the piston through the piston pin, such that the pressure applied to the piston from the combustion chamber is transmitted to the crankshaft and the crankshaft rotates.

FIG. 1 is a view showing a piston structure of the related art, in which with a piston 500 and a connecting rod 502 connected by a piston pin 504, snap rings 506 are mounted on piston 500 to fix both end portions of piston 504.

In the structure where piston pin 504 is inserted to connect piston 500 with connecting rod 502 and then both end portions are fixed by snap rings 506, as described above, it takes long time to sequentially mount snap rings 506 at both sides and the weight of piston 500 increases due to margin thicknesses that are necessarily provided outside snap rings 506 to support snap ring 506 to piston 500 in order to fasten snap rings 506, as described above. Further, it is required to increase the length of piston pin 504 to ensure sufficient contact area between the piston pin 504 and piston 500, which is a limitative factor.

Further, as described above, since snap ring groove 508 is formed on piston 500 to mount snap rings 506 and then piston pin 504 is inserted, piston pin 504 frequently scratches the portion between piston pin 504 and piston 500 while passing through snap ring grooves 508, when being inserted into piston 500, which interfere with normal operation of piston 500 and decreases durability.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a piston apparatus for an engine that makes it possible to relatively easily and quickly assembling a piston with a connecting rod, has the advantage of reducing the weight of the piston or ensuring the contact area between the piston pin and the piston, and can smoothly operation with the durability improved by preventing scratches in assembling the piston with the piston pin.

In an aspect of the present invention, the piston apparatus for an engine may include a piston pin inserted in a smaller end portion of a connecting rod and having a cross-section changing portion where a cross section changes at a portion of the piston pin, and a fixing member engaging the connecting rod and a piston through the cross-section changing portion to restrain longitudinal movement of the piston pin with respect to the connecting rod.

The cross-section changing portion of the piston pin may be a piston pin groove depressed from an outer surface of the piston pin in a ring shape with a predetermined depth, wherein the fixing member may be a connecting pin inserted in the smaller end portion of the connecting rod and coupled in the piston pin groove.

The connecting pin may include at least a straight portion and a connecting portion connecting an end of the at least a straight portion and the at least a straight portion may be inserted in the connecting hole and coupled to the piston pin groove, wherein the connecting hole may include a large diameter portion and a small diameter portion.

The connecting pin may be formed in a U-shape having two straight portions parallel with each other and a connecting portion connecting ends of the two straight portions, and the two straight portions may be inserted in two connecting holes formed in the smaller end portion of the connecting rod and coupled to each piston pin groove.

The two connecting holes may be formed in the longitudinal direction of the connecting rod, at the smaller end portion of the connecting rod, and a connecting portion groove where the connecting portion of the connecting pin is inserted may be formed at an outer circumference of the smaller end portion of the connecting rod, wherein the connecting holes may include a large diameter portion and a small diameter portion.

A bush may be disposed between the connecting rod and the piston pin, and through-holes that the straight portions of the connecting pin pass through, may be formed at both lateral sides of the bush.

Chamfered portions may be formed in the piston combined with the connecting rod by the piston pin, around both ends of the piston pin to reduce the weight of the piston.

According to the exemplary embodiments of the present invention, it possible to relatively easily and quickly assembling a piston with a connecting rod, has the advantage of reducing the weight of the piston or ensuring the contact area between the piston pin and the piston, and can smoothly operation with the durability improved by preventing scratches in assembling the piston with the piston pin.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
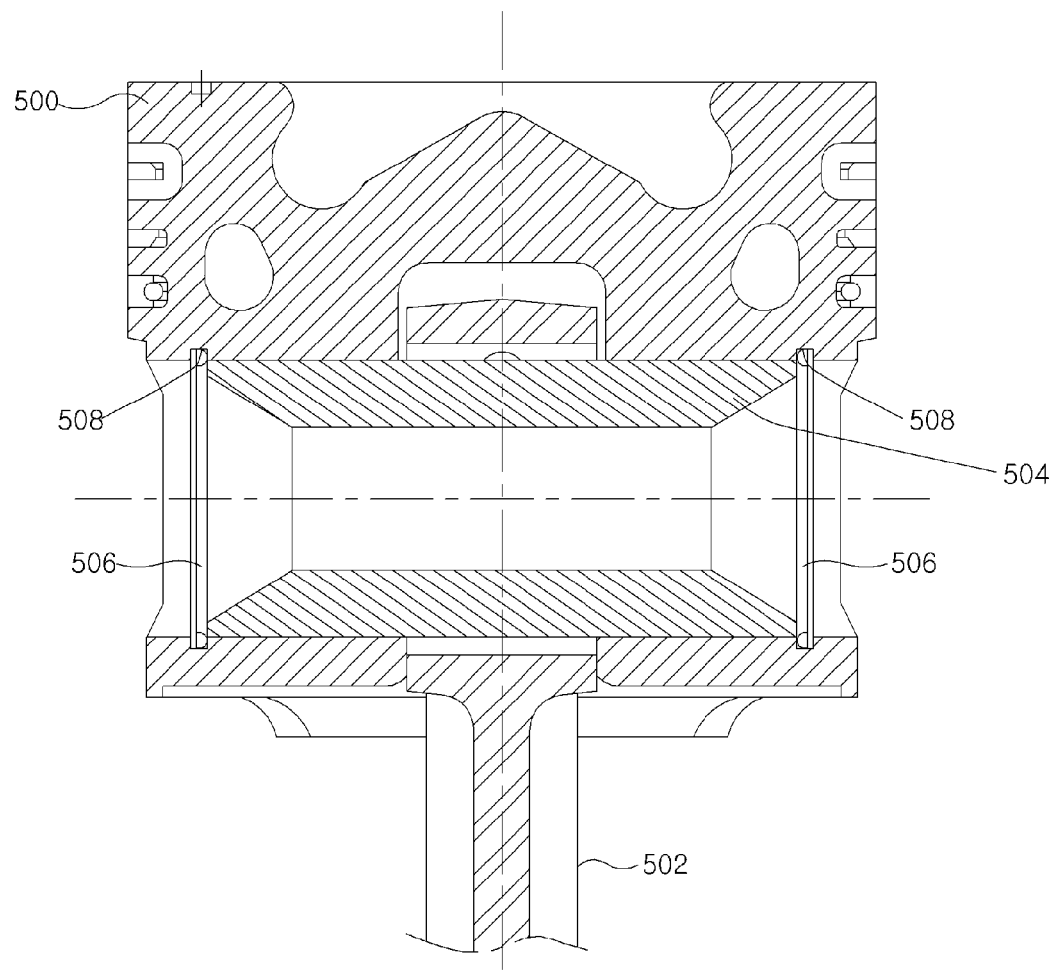
FIG. 1 is a view illustrating the connecting structure of a piston apparatus according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
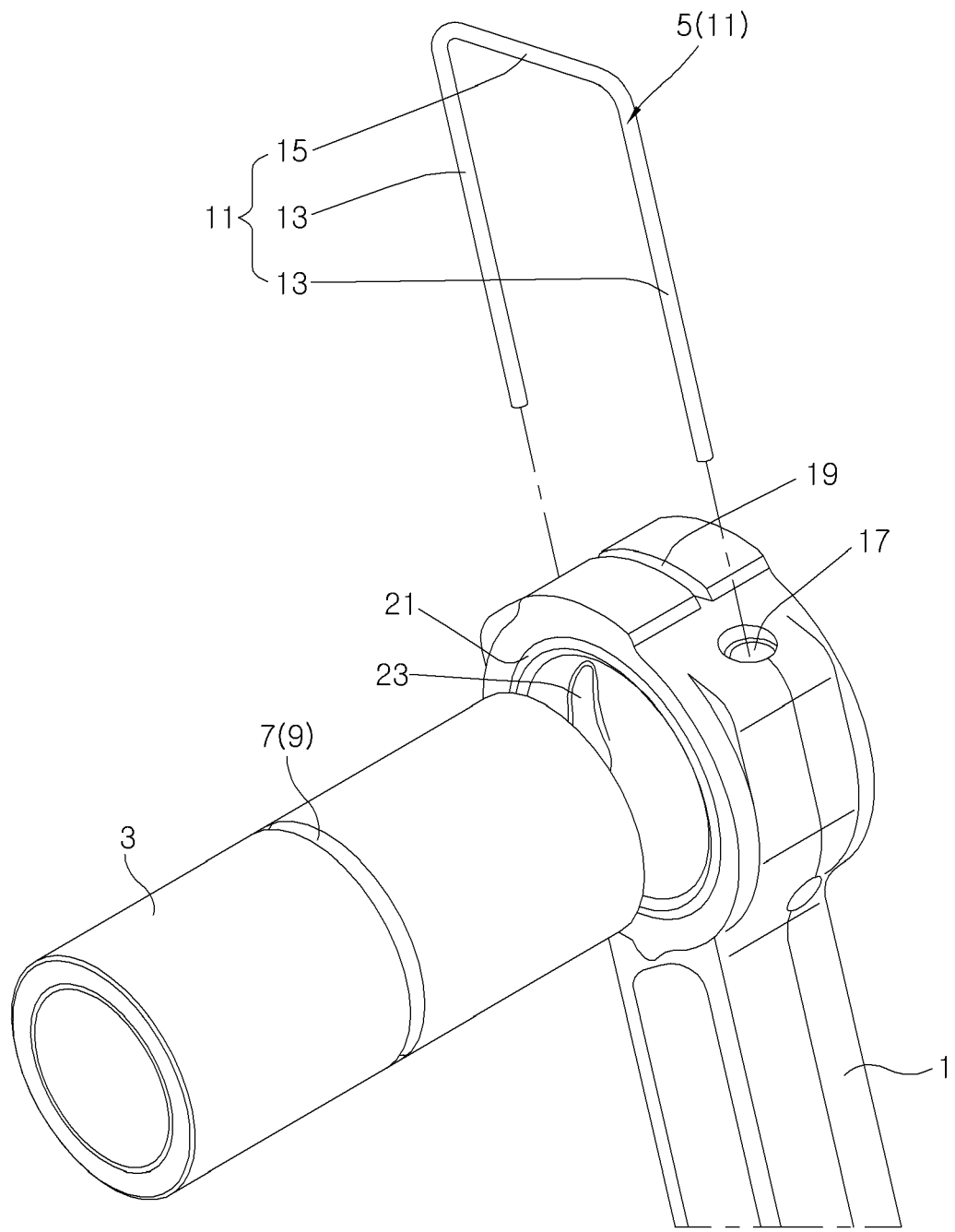
FIG. 2 is a view showing the main part of a piston apparatus for an engine according to an exemplary embodiment of the present invention.
Figure 3:
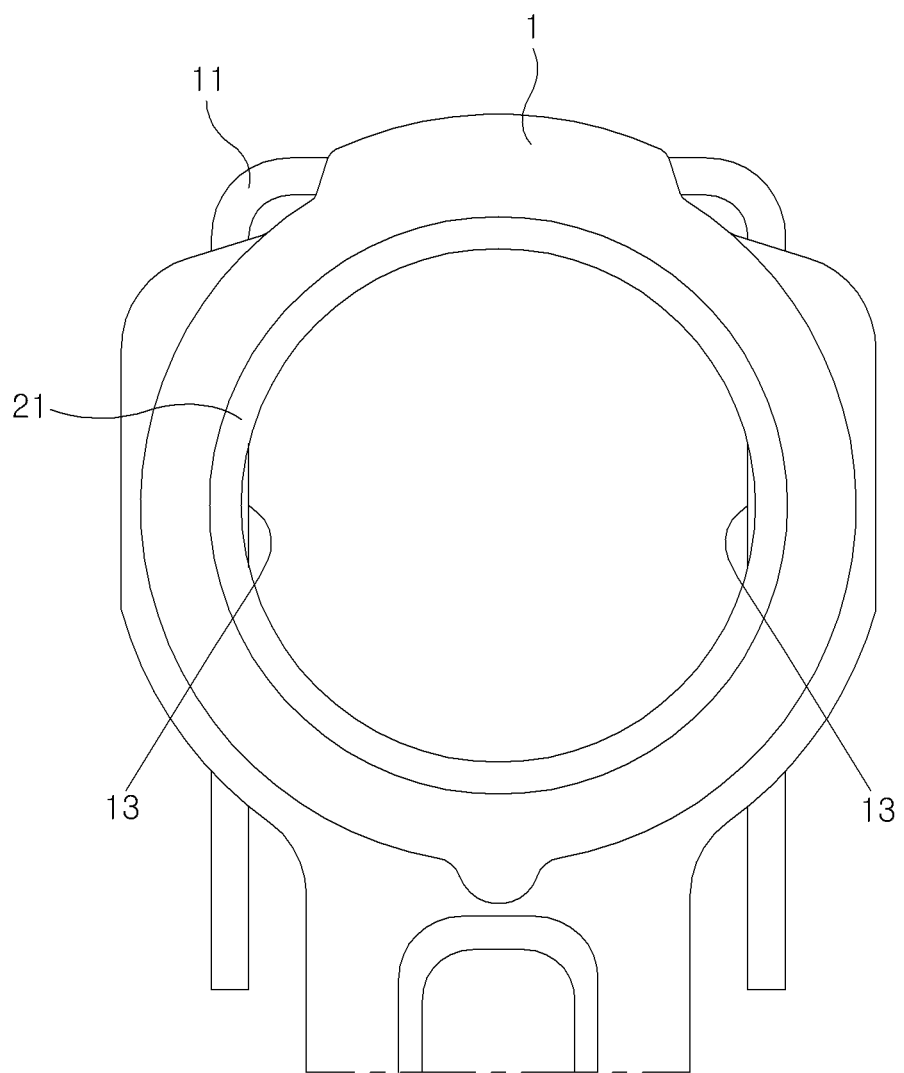
FIG. 3 is a side view showing when a connecting pin is inserted in a connecting rod according to an exemplary embodiment of the present invention.
Figure 4:
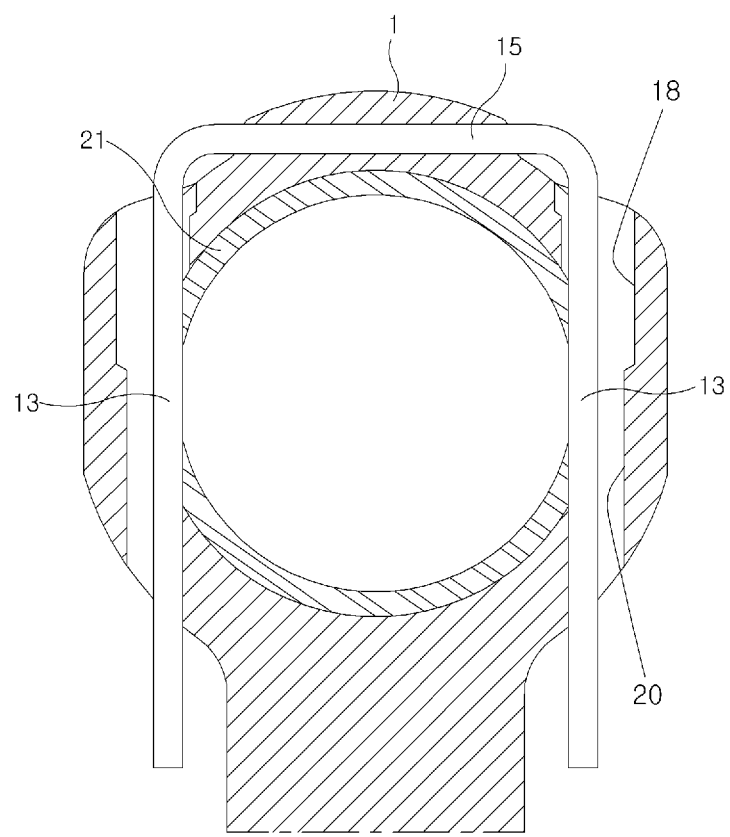
FIG. 4 is a cross-sectional view showing when a connecting pin is inserted in a connecting rod according to an exemplary embodiment of the present invention.
Figure 5:
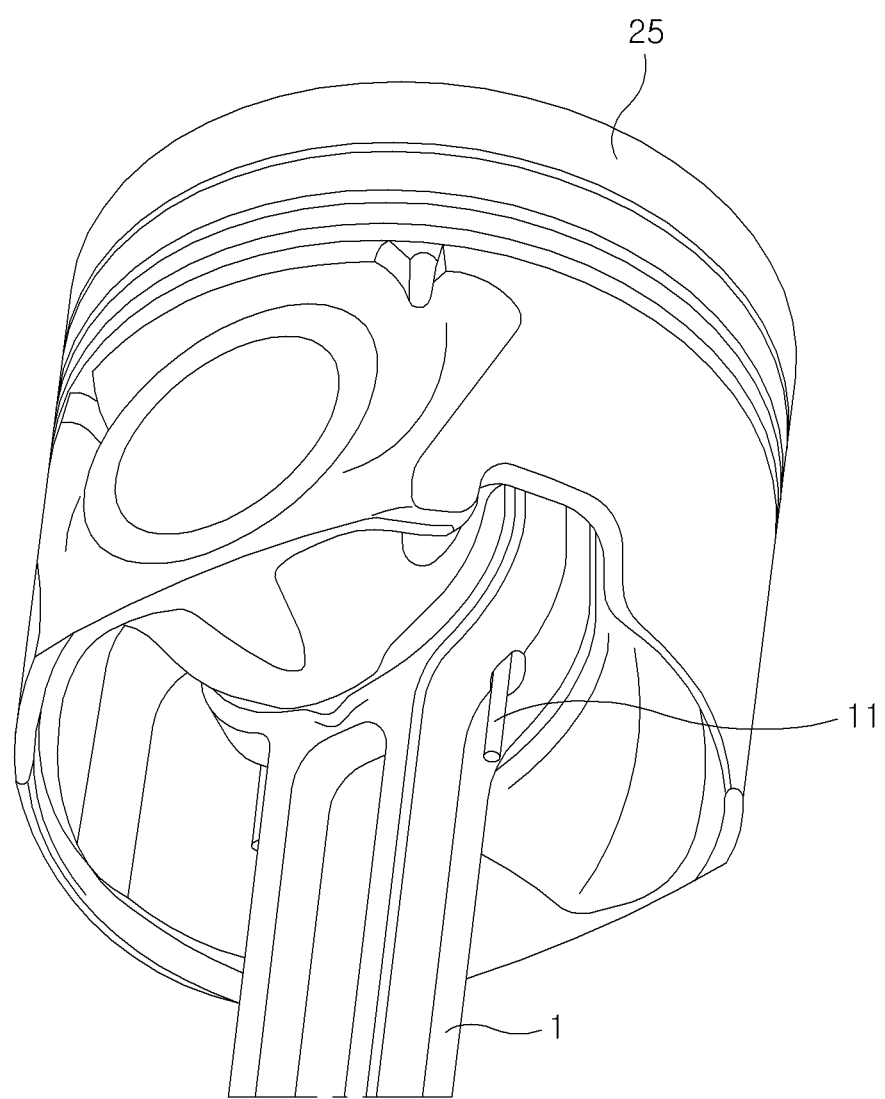
FIG. 5 is a cross-sectional view showing when the piston and the connecting rod are assembled, according to an exemplary embodiment of the present invention.

Referring to FIGS. 2 to 4, an exemplary embodiment of the present invention includes: a piston pin 3 having a cross-section changing portion where the cross section locally and longitudinally changes at the portion inserted in a smaller end portion of a connecting rod 1, and a fixing member 5 that is combined with connecting rod 1 and cross-section changing portion 7 of piston pin 3 and restrains longitudinal movement of piston pin 3 with respect to connecting rod 1.

In the exemplary embodiment, cross-section changing portion 7 of piston pin 3 is implemented by a piston pin groove 9 depressed from the surface of piston pin 3 in a ring shape along the circumference at the longitudinal center of piston pin 3.

Fixing member 5 is implemented by a connecting pin 11 inserted in the smaller end portion of connecting rod 1 and inserted in piston pin groove 9 at at least one position, where connecting pin 11 is formed in a U-shape having two straight portions 13 parallel with each other and a connecting portion 15 connecting the ends of straight portions 13 and straight portions 13 are inserted in the smaller end portion of connecting rod 1.

Connecting holes 17 where straight portions 13 of connecting pin 11 are inserted are formed in the smaller end portion of connecting rod 1. Connecting holes 17 are formed in the longitudinal direction of connecting rod 1, at the smaller end portion of connecting rod 1, while a connecting portion groove 19 where connecting portion 15 of connecting pin 11 is inserted is formed at the smaller end portion of connecting rod 1.

Figure 8:
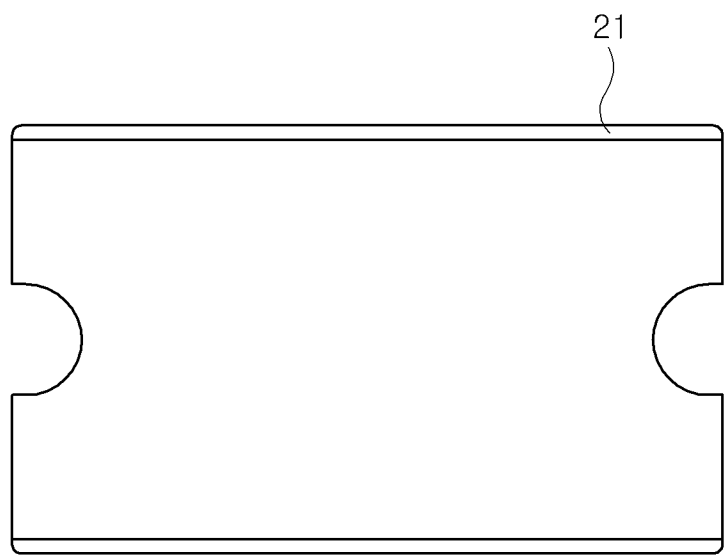
FIG. 8 is a view illustrating the structure of a bush according to an exemplary embodiment of the present invention.
Figure 8:
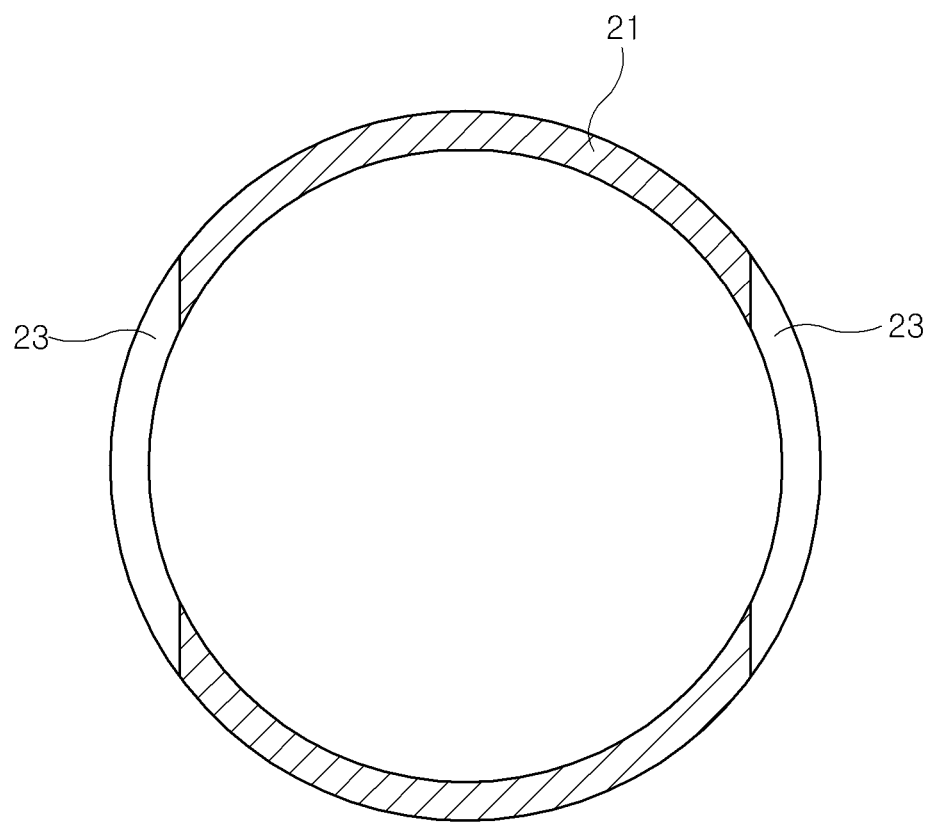

A bush 21 is disposed between connecting rod 1 and piston pin 3 and has through holes 23 that straight portions 13 of connecting pin 11 pass through, at both sides, as shown in detail in FIG. 8.

Chamfered portions 27 are formed in piston 25 combined with connecting rod 1 by piston pin 3, around both ends of piston pin 3 to reduce the weight of piston 25.

The present invention having the configuration described above may be described as following, that is, an exemplary embodiment of the present invention includes: piston 25, connecting rod 1 rotatably combined with piston 25, piston pin 3 rotatably combined with connecting rod 1 at the center and having both ends rotatably connected to piston 25, and fixing member 5 fixing connecting rod 1 and piston pin 3 such that piston pin 3 is allowed to rotate with respect to connecting rod 1 and prevented from moving straight in the longitudinal direction.

Fixing member 5 is connecting pin 11 inserted inward from the outside the smaller end portion of connecting rod 1 and piston pin groove 9 is formed in piston pin 3 to lock connecting pin 11.

Connecting pin 11 is formed in a U-shape having two parallel straight portions 13 and connecting portion 15 connecting the ends of straight portions 13 and piston pin groove 9 is formed in a ring shape along the circumference at the longitudinal center of piston pin 3.

Bush 21 is disposed between connecting rod 1 and piston pin 3 and has through-holes 23 that straight portions 13 of connecting pin 11 pass through.

Connecting holes 17 are formed longitudinally in the smaller end portion of connecting rod 1 such that straight portions 13 of connecting pin 11 are inserted, while a connecting portion groove 19 connecting the ends of connecting holes 17 such that connecting portion 15 of connecting pin 11 is inserted is formed at the smaller end portion of connecting rod 1.

In an exemplary embodiment of the present invention, the connecting hole 17 includes a large diameter portion 18 and a small diameter portion 20 such that the straight portion 13 are easily assembled into the large diameter portion 18 at first, and then aligned into the small diameter portion 20, thereby reducing working time.

Chamfered portions 27 are formed in piston 25 combined with connecting rod 1 by piston pin 3, around both ends of piston pin 3 to reduce the weight of piston 25.

In piston 25 for an engine, which as the structure according to the exemplary embodiment of the present invention, various problems in the related art can be removed by combining connecting rod 1 with piston pin 3 by using connecting pin 11, without using snap rings combined with the piston to restrict movement of both ends of the piston pin in the longitudinal direction of the piston pin inserted in the piston in the related art.

Figure 6:
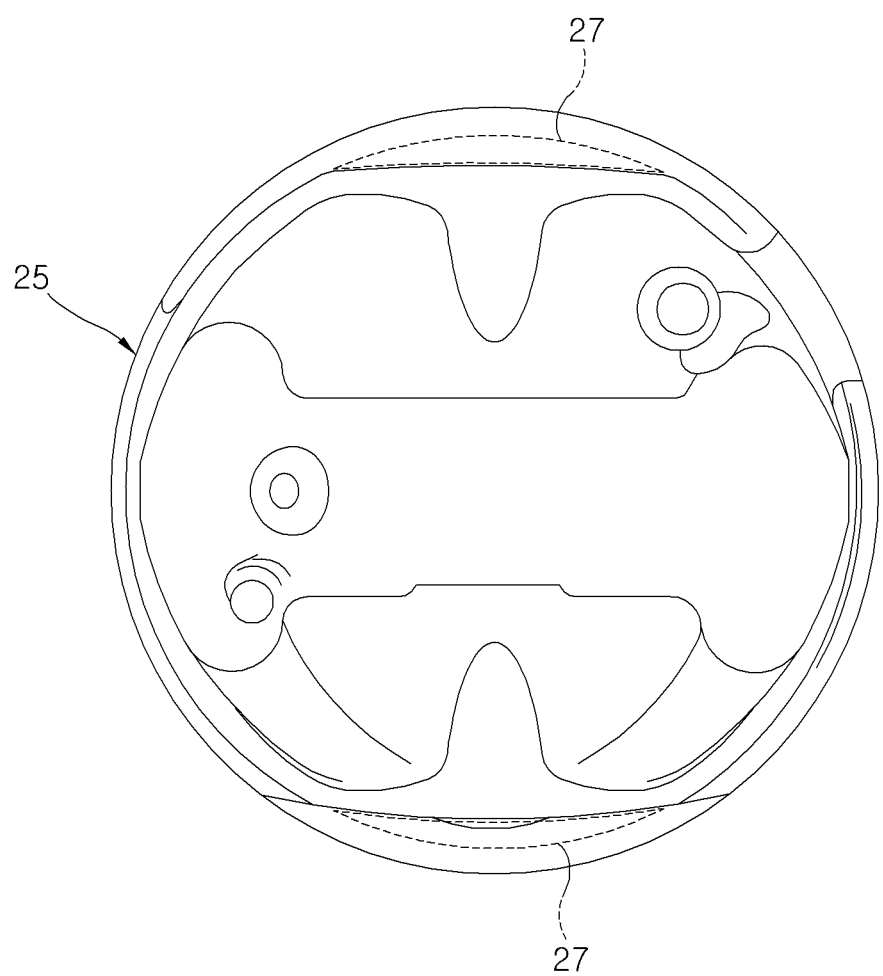
FIG. 6 is a view illustrating the structure of a piston according to an exemplary embodiment of the present invention.
Figure 7:
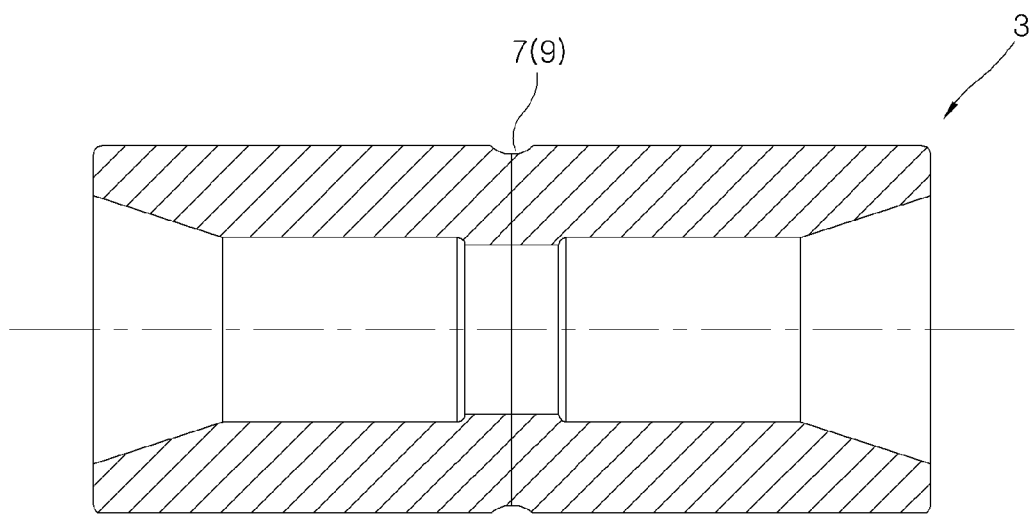
FIG. 7 is a view illustrating the structure of the piston pin according to an exemplary embodiment of the present invention.

That is, since it does not need to mount a snap ring to restrict piston pin 3 in piston 25, it is possible to form chamfered portions 27, as shown in FIG. 6, by cutting off the portions of the piston which are provided to support the snap ring at the outside of the snap rings, such that it is possible to reduce the weight of the piston 25.

Alternatively, in order to increase the length of the piston pin 3 to ensure a sufficient contact area between piston pin 3 and piston 25, it is possible to ensure a sufficient contact area between piston pin 3 and piston 25 and improve durability by increasing the length of piston pin 3 above the range restrained by the snap rings in the related art, instead of forming the chamfered portions described above.

Further, since a groove for fixing a snap ring is not formed in piston 25, there is no scratch between piston 25 and piston pin 3 when inserting piston pin 3, such that the piston apparatus can smoothly operate and durability can be improved.

Further, with connecting rod 1 and piston 25 combined by piston pin 3, the assembly is completed only by inserting connecting pin 11 from the outside of the smaller end portion of connecting rod 1, such that the work time is short and the assembly work becomes easy, as compared with when snap rings are mounted two times in the related art.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A piston apparatus for an engine, comprising:
    a piston pin rotatably inserted in a smaller end portion of a connecting rod and having a cross-section changing portion where a cross section changes at a portion of the piston pin; and
    a fixing member rotatably engaging the connecting rod and a piston through the cross-section changing portion to restrain longitudinal movement of the piston pin with respect to the connecting rod;
    wherein the cross-section changing portion of the piston pin is a piston pin groove depressed from an outer surface of the piston pin in a ring shape with a predetermined depth; and
    wherein the fixing member is a connecting pin passing through and inserted in the smaller end portion of the connecting rod and being coupled in the piston pin groove of the piston pin in the smaller end portion of the connecting rod;
    wherein the connecting pin is formed in a U-shape having two straight portions parallel with each other and a connecting portion connecting ends of the two straight portions, and
    the two straight portions are inserted in two connecting holes formed in the smaller end portion of the connecting rod and coupled to each piston pin groove.

2. The piston apparatus for the engine as defined in claim 1, wherein the connecting pin includes at least a straight portion and a connecting portion connecting an end of the at least a straight portion and the at least a straight portion is inserted in a connecting hole and coupled to the piston pin groove.

3. The piston apparatus for the engine as defined in claim 2, wherein the connecting hole includes a large diameter portion and a small diameter portion.

4. The piston apparatus for the engine as defined in claim 1, wherein the two connecting holes are formed in the longitudinal direction of the connecting rod, at the smaller end portion of the connecting rod, and
    the connecting pin is inserted in a connecting portion groove formed at an outer circumference of the smaller end portion of the connecting rod.

5. The piston apparatus for the engine as defined in claim 4, wherein the connecting holes include a large diameter portion and a small diameter portion.

6. The piston apparatus for the engine as defined in claim 1, wherein a bush is disposed between the connecting rod and the piston pin, and
    through-holes that the straight portions of the connecting pin pass through, are formed at both lateral sides of the bush.

7. The piston apparatus for the engine as defined in claim 1, wherein chamfered portions are formed in the piston combined with the connecting rod by the piston pin, around both ends of the piston pin to reduce the weight of the piston.

8. A piston apparatus for an engine, comprising:
    a piston;
    a connecting rod rotatably combined with the piston;
    a piston pin rotatably combined with the connecting rod at the center thereof and having both ends rotatably connected to the piston; and
    a fixing member rotatably fixing the connecting rod and the piston pin such that the piston pin is allowed to rotate with respect to the connecting rod and prevented from moving straight in the longitudinal direction;
    wherein a piston pin groove is formed in the piston pin;
    wherein the fixing member is a connecting pin passing through and inserted in a smaller end portion of the connecting rod and being coupled in the piston pin groove of the piston pin in the smaller end portion of the connecting rod;
    wherein the connecting pin is formed in a U-shape having two parallel straight portions and a connecting portion connecting the ends of the straight portions, and
    the piston pin groove is formed in a ring shape along the circumference at the longitudinal center of the piston pin;
    wherein connecting holes are formed longitudinally in the smaller end portion of the connecting rod such that the straight portions of the connecting pin are inserted, and
    a connecting portion groove connecting ends of the connecting holes such that the connecting portion of the connecting pin is inserted is formed at the smaller end portion of the connecting rod.

9. The piston apparatus for the engine as defined in claim 8, wherein a bush is disposed between the connecting rod and the piston pin, and
    through-holes that the straight portions of the connecting pin pass through, are formed in the bush.

10. The piston apparatus for the engine as defined in claim 8, wherein the connecting holes include a large diameter portion and a small diameter portion.

11. The piston apparatus for the engine as defined in claim 10, wherein chamfered portions are formed in the piston combined with the connecting rod by the piston pin, around both ends of the piston pin to reduce the weight of the piston.

* * * * *